United States Patent
Verwoerd et al.

(10) Patent No.: US 12,444,069 B2
(45) Date of Patent: Oct. 14, 2025

(54) SPORTS TIMING BASED ON A CAMERA SYSTEM

(71) Applicant: MYLAPS B.V., Haarlem (NL)

(72) Inventors: Adriaan Klaas Verwoerd, Haarlem (NL); Taylor Dalton Host, Haarlem (NL); James Alexander Wilde, Haarlem (NL); King-Hei Fung, Haarlem (NL); Kai Wayne Fong, Haarlem (NL); John Zin Hang Ho, Haarlem (NL); Benjamin Stuart Ross, Haarlem (NL)

(73) Assignee: MYLAPS B.V., Haarlem (NL)

( * ) Notice: Subject to any disclaimer, the term of this patent is extended or adjusted under 35 U.S.C. 154(b) by 379 days.

(21) Appl. No.: 17/642,564

(22) PCT Filed: Sep. 14, 2020

(86) PCT No.: PCT/EP2020/075671
§ 371 (c)(1),
(2) Date: Mar. 11, 2022

(87) PCT Pub. No.: WO2021/048446
PCT Pub. Date: Mar. 18, 2021

(65) Prior Publication Data
US 2022/0327720 A1  Oct. 13, 2022

(30) Foreign Application Priority Data
Sep. 14, 2019 (EP) .................................. 19197427

(51) Int. Cl.
*G06T 7/593* (2017.01)
*G06T 7/70* (2017.01)
(Continued)

(52) U.S. Cl.
CPC ................ *G06T 7/593* (2017.01); *G06T 7/70* (2017.01); *G06V 10/22* (2022.01); *G06V 10/62* (2022.01);
(Continued)

(58) Field of Classification Search
None
See application file for complete search history.

(56) References Cited

U.S. PATENT DOCUMENTS 5,729,471 A    3/1998 Jain et al.
6,433,817 B1   8/2002 Guerra
(Continued)

FOREIGN PATENT DOCUMENTS

CN   109565581 A      4/2019
DE   102006006667 A1  8/2007
(Continued)

OTHER PUBLICATIONS

Office action is corresponding European application No. 20768619.7 dated Feb. 22, 2023.
(Continued)

*Primary Examiner* — Tahmina N Ansari
(74) *Attorney, Agent, or Firm* — Steven M. Koehler; Westman, Champlin & Koehler, P.A.

(57) ABSTRACT

A method for determining a passing time of an object passing a timing line across a sports track comprises receiving a sequence of time-stamped video frames captured by at least one camera representing pictures of a scene of one or more objects moving along a track; determining depth maps for the sequence of frames comprising information regarding the distance between the one or more objects in the picture of a frame and the camera system; detecting one or more objects using an object detection algorithm; determining a detected object in the frames passing a timing line
(Continued)

across a track, the timing line being defined by a virtual plane at a predetermined distance from the camera, the determination of the passing being based on the coordinates of the virtual plane and the depth maps; determining a passing time based on a time stamp of a frame comprising a detected object passing the timing line.

15 Claims, 10 Drawing Sheets

(51) Int. Cl.
*G06V 10/22* (2022.01)
*G06V 10/62* (2022.01)
*G06V 10/70* (2022.01)
*G06V 20/40* (2022.01)

(52) U.S. Cl.
CPC .............. *G06V 10/70* (2022.01); *G06V 20/42* (2022.01); *G06T 2207/10016* (2013.01); *G06T 2207/20081* (2013.01); *G06T 2207/30204* (2013.01); *G06T 2207/30221* (2013.01)

(56) References Cited

U.S. PATENT DOCUMENTS

| | | | |
|---|---|---|---|
| 8,077,917 B2* | 12/2011 | Forsgren | G06T 7/194 348/157 |
| 8,432,489 B2* | 4/2013 | Arseneau | H04N 21/2543 348/157 |
| 9,291,713 B2† | 3/2016 | Shaw | |
| 10,315,093 B2* | 6/2019 | Tuxen | A63B 24/0003 |
| 10,489,655 B2† | 11/2019 | Martin | |
| 11,413,094 B2* | 8/2022 | Qiu | G16H 40/67 |
| 11,730,545 B2* | 8/2023 | Qiu | G16H 40/67 606/34 |
| 2007/0022447 A1* | 1/2007 | Arseneau | H04H 60/15 725/38 |
| 2008/0089666 A1* | 4/2008 | Aman | G11B 27/105 |
| 2008/0199043 A1* | 8/2008 | Forsgren | G06T 7/194 382/103 |
| 2013/0194427 A1* | 8/2013 | Hunter | H04N 7/188 348/157 |
| 2017/0087476 A1 | 3/2017 | Perry | |
| 2017/0161913 A1* | 6/2017 | Khazanov | G06T 7/292 |
| 2017/0182361 A1* | 6/2017 | Tuxen | A63B 24/0021 |
| 2019/0236364 A1* | 8/2019 | Hall | G06V 20/20 |
| 2020/0367970 A1* | 11/2020 | Qiu | A61B 90/36 |
| 2021/0073563 A1 | 3/2021 | Karianakis et al. | |
| 2022/0172450 A1 | 6/2022 | Karianakis et al. | |
| 2022/0327720 A1* | 10/2022 | Verwoerd | G06V 10/70 |
| 2022/0378510 A1* | 12/2022 | Qiu | A61B 90/36 |

FOREIGN PATENT DOCUMENTS

| | | |
|---|---|---|
| EP | 0384496 A2 | 8/1990 |
| EP | 3792815 A1 | 3/2021 |
| WO | 2015088795 A1 | 6/2015 |
| WO | 2023033653 A1 | 3/2021 |

OTHER PUBLICATIONS

Hafiz et al. "A Survey on Instance Segmentation: State of the Art", International Journal of Multimedia Information Retrieval, 2020, pp. 171-189, vol. 9.
Putra, M. and Wahyono, "A Novel Method for Handling Partial Occlusion on Person Re-Identification Using Partial Siamese Network", International Journal of Advanced Computer Science and Applications (IJACSA), Jul. 31, 2021, pp. 313-321, vol. 12, No. 7.
Wang et al. "A Comprehensive Overview of Person Re-Identification Approaches", IEEE Access, Mar. 2020, pp. 45556-45583, vol. 8.
Zhuo et al. "Occluded Person Re-Identification", 2018 IEEE International Conference on Multimedia and Expo (ICME), Jul. 23, 2018, 6 pages.
Office action in corresponding Chinese application No. 202080073114.2 dated Jun. 5, 2023.
Office Action in corresponding European patent application No. 20768619.7 dated Oct. 4, 2023.
International Search Report and Written Opinion in corresponding International Application No. PCT/EP2020/075671 dated Jun. 25, 2020.
Office Action in corresponding European application No. 20768619.7 dated May 21, 2024.

\* cited by examiner
† cited by third party

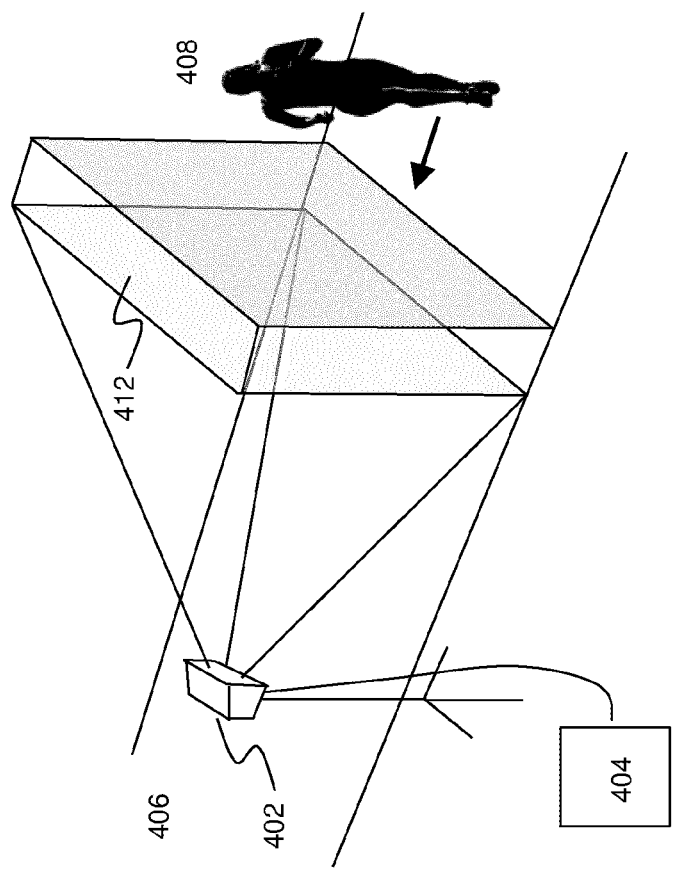
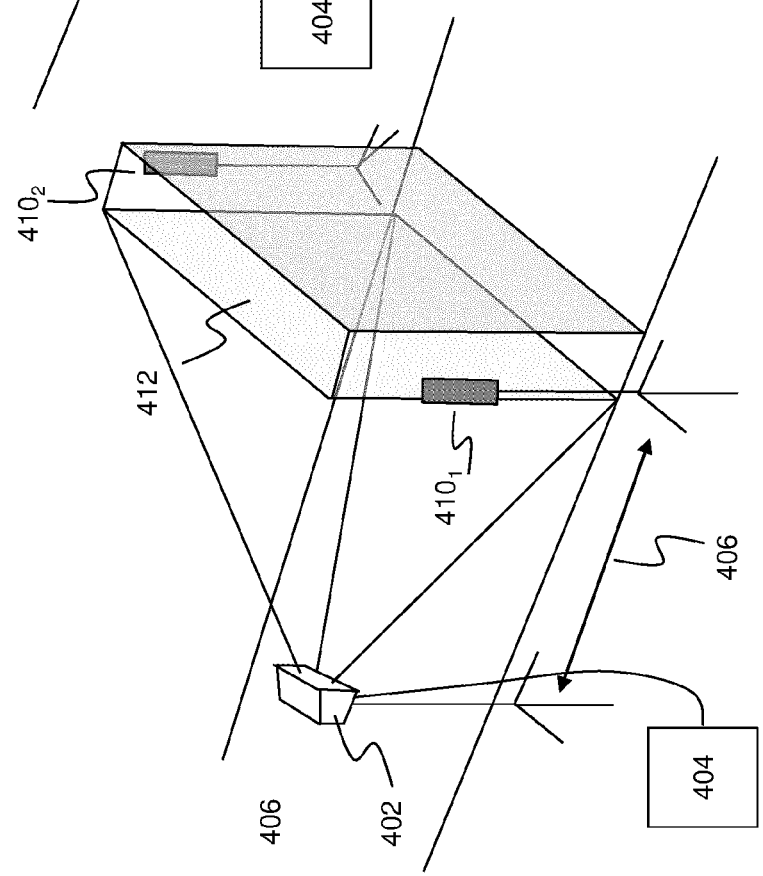
FIG. 4B
FIG. 4A

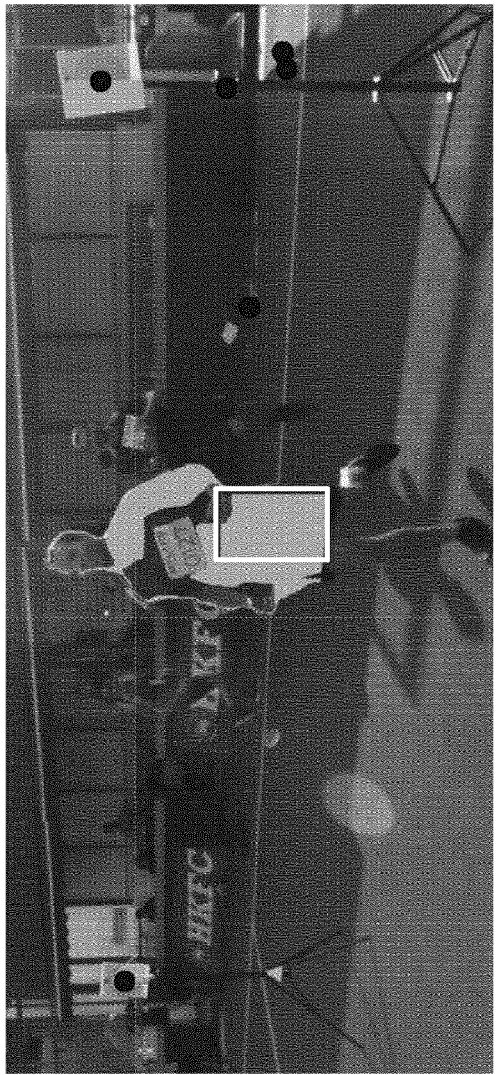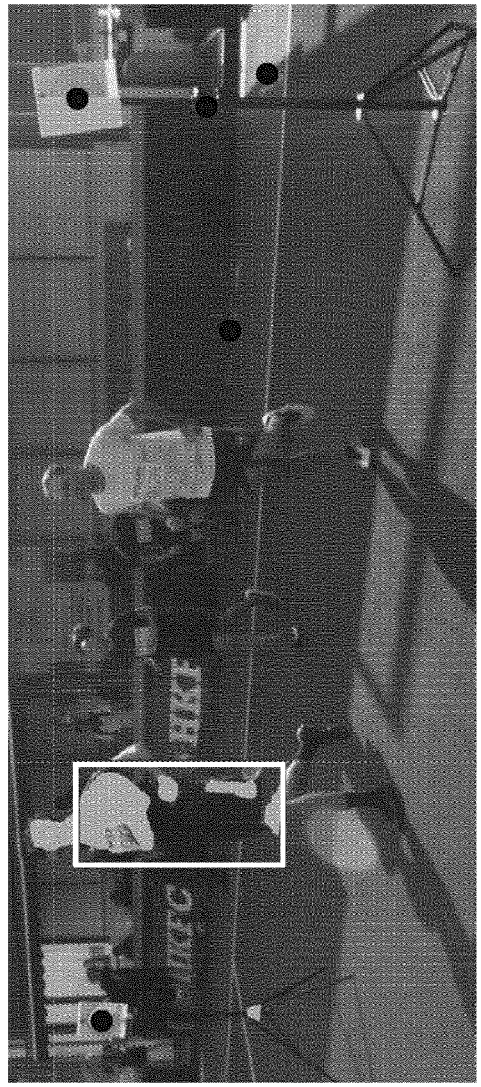
FIG. 10

SPORTS TIMING BASED ON A CAMERA SYSTEM

CROSS-REFERENCE TO RELATED APPLICATION(S)

This application is a 371 National Stage Application of International Application No. PCT/EP2020/075671, filed Sep. 14, 2020 and published as WO 2021/048446 A1 on Mar. 18, 2021, and further claims priority to European Application Ser. No. 19197427.8, filed Sep. 14, 2019.

FIELD OF THE INVENTION

The disclosure relates to sports timing based on a camera system and, in particular, though not exclusively, to methods and systems for sports timing based on a camera system, and a computer program product enabling a computer system to perform such methods.

BACKGROUND OF THE INVENTION

Sports events such as car- or motor racing, cycling, athletics, drones and ice-skating, typically require accurate and fast time registration for tracking objects (persons or vehicles) during the event. Such timing system is usually based on an RFID system, wherein each participant in the event is provided with an RFID transponder, e.g. an UHF back scattering tag or an LF tag based on magnetic induction, which can be read out by RFID readers that are positioned along the track. Such readers may be implemented in the form of an antenna mat, side antenna's and/or antenna's mounted on a frame above a track. Each transponder is configured to transmit packets at a certain frequency and to insert a unique identifier into the packet such that a detector is able to associate a packet with a certain transmitter.

When a participant enters the detection zone of a reader, the transport will start transmitting signals which will be received by the reader. The signals may be timestamped so that an algorithm in the reader may determine a passing time based on one or multiple received signals of a passing. Currently RFID technology can be used to build very reliable time systems for mass events with a reliability of 99.8 percent or more. Similarly, RFID technology can be used to build very accurate timing systems allowing determination of passing times with an accuracy below a hundredth of second.

While providing reliable and accurate timing systems RFID system have certain drawbacks. One drawback relates to the fact that each participant requires to have a transponder. Thus, before a marathon every participant is provided with a BIB that includes an UHF tag that is configured to transmit an ID that is uniquely related to the BIB ID. Further drawbacks relate to the fact that UHF tags transmitting and receiving signals are relatively sensitive to environmental influences, including reflecting and absorbing objects and collisions (e.g. when a large number of UHF tags simultaneously transmit signals that need to be picked up by the reader). Additionally, the working frequency of the tags are close to the working frequency of other mobile devices which may cause unwanted interference effects.

In the prior art it has been suggested to use a vision-based timing system, i.e. a timing system that is based on analyzing information captured by one or more camera's that capture a time series of video frames of participants of an events. For example, U.S. Pat. No. 6,433,817 describes a camera system for measuring a participant passing a virtual finish line. The camera includes a camera which is capable of capturing RGB images and IR images. The IR images are generated by a laser transmitting IR pulses towards the finish line. This way, the camera is capable to determine depth information associated with objects, e.g. participants, passing the finish line. Similarly, DE 10 2006 006 667 provides a high level system of a camera-based camera system for timing a mass event such as a marathon.

This document addresses the problem that in mass events a large number of participants will simultaneously or almost simultaneously pass the finish line. The document suggests to use a multitude of markers of participants to enable the system to identify each participants. While at a high-level this may seem a sensible solution, it does not describe the realization of such system. The realization of a vision-based timing system that meets the requirements in terms of reliability and accuracy needed for professional use is not a trivial exercise.

For example, Lynx technologies currently markets a camera-based timing system. This system includes a (ultra) high-speed photo-finish camera for determining a passage time that is positioned in parallel with a finish line in combination with a video camera that is positioned in front of the finish line for identifying different objects passing the finish line (almost) simultaneously. A photo-finish camera is not suitable for mass events as too many participants cannot be identified visually. Further, high speed cameras are very expensive and thus not suitable for determining the passage time for mass events at multiple points along a track in a simple fashion. Such camera system cannot compete with the reliability, accuracy and costs currently offered by RFID timing systems.

Hence, from the above, it follows that there is a need in the art for improved vision-based timing of sports events, that allows reliable determination of passing times and identification of a sports event, in particular a sports event with many participants. In particular, there is a need in the art for vision-based timing of sports events that is fast, reliable, easy to set-up and simple in use.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including a functional or an object oriented programming language such as Java™, Scala, C++, Python or the like and conventional procedural programming languages, such as the "C" programming language or similar programming languages. The program code may execute entirely on the user's computer, partly on the users computer, as a stand-alone software package, partly on the users computer and partly on a remote computer, or entirely on the remote computer, server or virtualized server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), or graphics processing unit (GPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is an objective of the embodiments in this disclosure to reduce or eliminate at least one of the drawbacks known in the prior art. In an aspect, the invention may relate to a method for determining a passing time of an object passing a timing line across a sports track comprising: receiving a sequence of video frames captured by at least one camera system, preferably a 3D camera system, each video frame representing a picture of scene of one or more objects, for example a person, an animal or a vehicle, moving along a track and each video frame being time-stamped; determining depth information, e.g. depth maps, for the sequence of video frames, the depth information comprising information regarding the distance between the one or more objects in the picture of a video frame and the camera system; detecting one or more objects in the video frames using an object detection algorithm, the one or more objects detected by the detection algorithm defined one or more detected objects; determining a detected object in the video frames passing a timing line across a sports track, the timing line being defined by a virtual plane located across the track at a predetermined distance from the camera system, the determination of the passing being based on the coordinates of the virtual plane and the depth information; and, determining a passing time based on a time stamp of a video frame comprising a detected object passing the timing line.

In an embodiment, the method may further comprise applying a feature analysis algorithm to the one or more detected objects in the video frames, the feature analysis algorithm determining identifying features for the one or more detected objects in the video frames; and, determining the identity of the detected object for which the passing time is determined based on the identifying features of the detected object that has passed the timing line.

In an embodiment, identifying features of a detected object include one or more an optically readable identification markers such as a race bib or a printed mark; and/or, one or more characteristics about the shape and/or color of the detected object; and/or, in case the detected object is an animal or a human, one or more biometric identifiers of the detected object.

In an embodiment, the object detection algorithm and the feature analysis algorithm may be part of a machine learning algorithm, preferably a deep learning algorithm such as a convolutional deep neural network system, that is trained to detected one or more objects in a video frame and to determine identifying features associated with detected objects.

In an embodiment, the detecting one or more objects in the video frames may include: determining one or more regions of interest ROIs in a video frame, each ROI comprising pixels representing an object; determine identifying features in one of the one or more ROIs; and, determine an object in the ROI based on the determined identifying features.

In an embodiment, the camera system may comprise a plurality of camera modules, preferably two camera modules forming a stereo camera, the stereo camera being configured to generate at each time instance at least a first video frame and a second video frame of the scene and wherein the depth map is determined based on a disparity mapping algorithm configured to determine a disparity between pixels of the first and second video frame.

In an embodiment, the passing time may be determined based on a video frame of the scene wherein a predetermined part of the detected object that has passed the virtual plane.

In a further aspect, the invention may relate to a method for determining a passing time of objects passing a timing line across a sports track comprising: receiving video frames from a plurality of camera systems, preferably the camera systems being time-synchronized, the plurality of camera systems capturing a scene of the sports track from different angles of view, the video frames representing pictures of the scene comprising one or more objects, for example a person, an animal or a vehicle, moving along the track, each of the video frames being time-stamped; determining depth information, e.g. depth maps, based on the received video frames, the depth information comprising information regarding a distance between the one or more objects in the picture of the video frames and the plurality of camera systems; detecting one or more objects in the video frames using an object detection algorithm, the one or more objects detected by the detection algorithm defined one or more detected objects; determining a detected object the video frames passing a timing line across the sports track, the timing line being defined by a virtual plane located across the track at predetermined distances from the plurality of camera systems, the determination of the passing being based on the coordinates of the virtual plane and the depth information maps; and, determining a passing time based on one or more time stamps of one or more video frames comprising the detected object passing the timing line.

In an embodiment, the method may further comprise: applying a feature analysis algorithm to the one or more detected objects in the video frames, the feature analysis algorithm determining identifying features for the one or more detected objects in the video frames; and, determining the identity of the detected object for which the passing time is determined based on the identifying features of the detected object that has passed the timing line.

In a further aspect, the invention may relate to a method for calibrating a timing system configured to determine a passing time of an object passing a timing line across a sports track, the method comprising: receiving a sequence of video frames captured by a camera system, preferably a 3D camera system, of a timing system, each video frame representing a picture of scene including the track and calibration markers positioned at opposite sides of the track; determining one or more depth maps based on the video frames, a depth map comprising information regarding the distance between one or more objects in the picture of a video frame; using the one or more the depth maps to determine the distance between the calibration markers and the camera system; determining the coordinates of a virtual plane that is positioned across the track between the markers, the virtual plane defining a timing line for the timing system; and, storing the coordinates of the virtual plane in a memory of the timing system.

In a further aspect, the invention relates to a system for determining a passing time of an object passing a timing line across a sports track wherein the system may comprise: at least one camera system connected to a computer; the computer comprising a computer readable storage medium having computer readable program code embodied therewith, and a processor, preferably a microprocessor, coupled to the computer readable storage medium, wherein responsive to executing the computer readable program code, the processor is configured to perform executable operations comprising: receiving a sequence of video frames captured by at least one camera system, preferably a 3D camera system, each video frame representing a picture of scene of one or more objects, for example a person, an animal or a vehicle, moving along a track and each video frame being time-stamped; determining depth maps for the sequence of video frames, a depth map comprising information regarding the distance between the one or more objects in the picture of a video frame and the camera system; detecting one or more objects in the video frames using an object detection algorithm, the one or more objects detected by the detection algorithm defined one or more detected objects; determining a detected object in one of the video frames passing a timing line across a sports track, the timing line being defined by a virtual plane located across the track at a predetermined distance from the camera system, the determination of the passing being based on coordinates of the virtual plane and the depth maps, preferably the coordinates being stored on the computer readable storage medium of the computer; and, determining a passing time based on a time stamp of a video frame comprising a detected object passing the timing line.

In an embodiment, the executable operations may further comprise: applying a feature analysis algorithm to the one or more detected objects in the video frames, the feature analysis algorithm determining identifying features for the one or more detected objects in the video frames; and, determining the identity of the detected object for which the passing time is determined based on the identifying features of the detected object that has passed the timing line.

In yet a further aspect, the invention may relate to a calibration module for a timing system configured to determine a passing time of an object passing a timing line across a sports track, the module comprising: receiving a sequence of video frames captured by a camera system, preferably a 3D camera system, of a timing system, each video frame representing a picture of scene including the track and calibration markers positioned at opposite sides of the track; determining one or more depth maps based on the video frames, a depth map comprising information regarding the distance between one or more objects in the picture of a video frame; using the one or more the depth maps to determine the distance between the calibration markers and the camera system; determine the coordinates of a virtual plane that is positioned across the track between the markers, the virtual plane defining a timing line for the timing system; and, storing the coordinates of the virtual plane in a memory of the timing system.

The invention may also relate to a computer program or suite of computer programs comprising at least one software code portion or a computer program product storing at least one software code portion, the software code portion, when run on a computer system, being configured for executing any of the method steps described above.

The invention may further relate to a non-transitory computer-readable storage medium storing at least one software code portion, the software code portion, when executed or processed by a computer, is configured to perform any of the method steps as described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIGS. 4A and 4B depicts calibration of a timing system according to an embodiment of the invention;

FIG. 10 depicts some exemplary pictures of objects passing a virtual plane of a timing system according to an embodiment of the invention.

DETAILED DESCRIPTION

Figure 1:
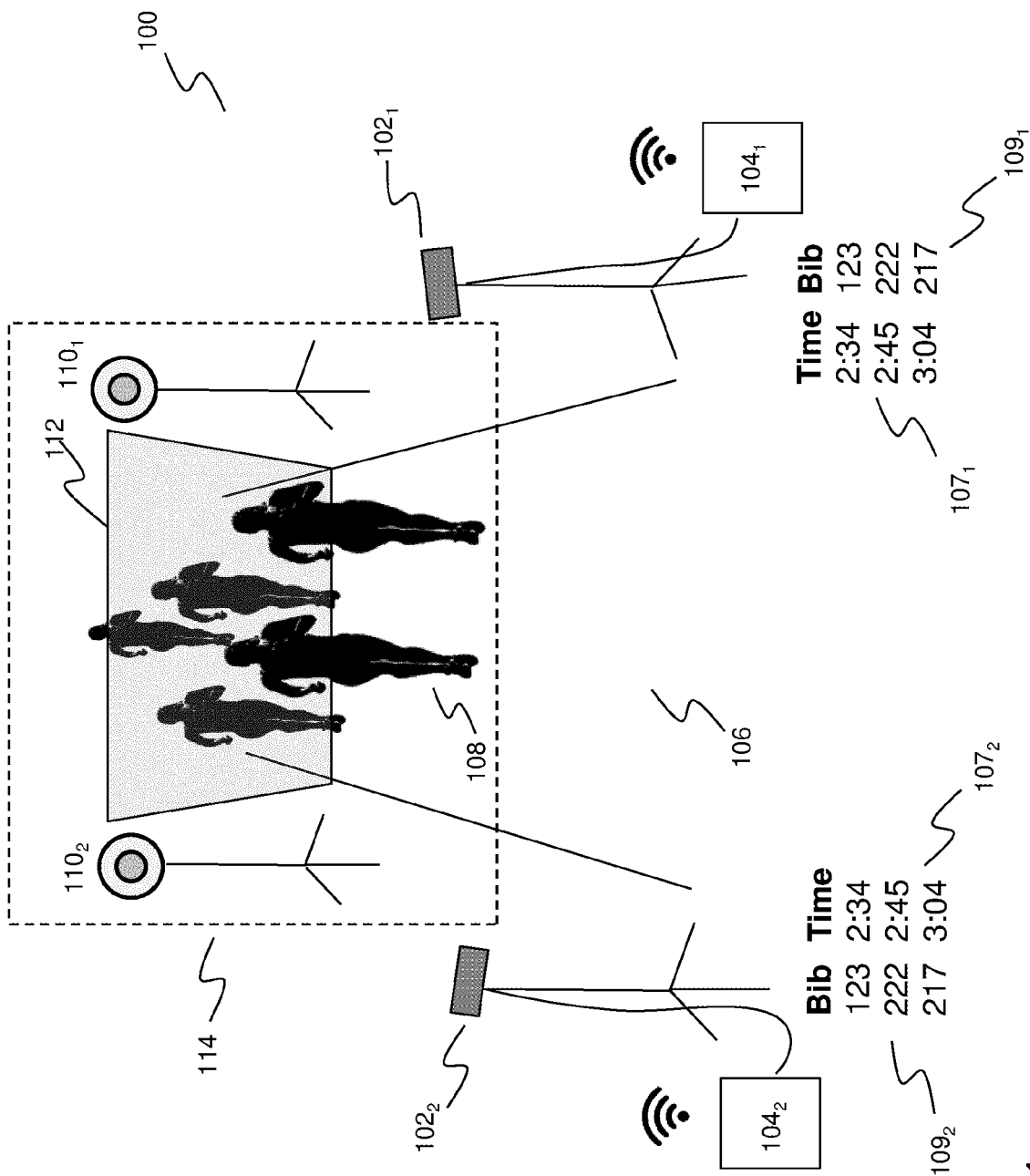
FIG. 1 depicts a schematic of a timing system according to an embodiment of the invention.

FIG. 1 depicts a timing system according to an embodiment of the invention. In particular, the figure depicts a vision-based sports timing system 100 including one or more camera systems $102_{1,2}$ controlled by a computer $104_{1,2}$. Each camera system may be configured to capture a scene of a sports track 106 and to determine depth information associated with the captured system. For example, in an embodiment, the depth information may include a so-called depth maps for video frames generated by an image sensor of the camera system. The depth map of a video frame, e.g. an RGB video frame, may be represented as a pixelated image comprising pixel values representing a distance value for each pixel of a video frame. The distance value may define a distance between the camera (the imaging plane of the camera) and objects in the video frames.

For example, a group of pixels in a video frame may be part of an object in the scene that is imaged by the camera system. In that case, the depth map may indicate the relative distance between the camera (the viewpoint) and the surface of the object in the scene. Hence, during capturing of a sequence of time-stamped video frames of an object, e.g. an athlete or a vehicle that is moving along the sports track, the associated depth maps may provide information about the distance between the moving object in the video frames and the (static) camera system as a function of time.

Figures 2, 3:
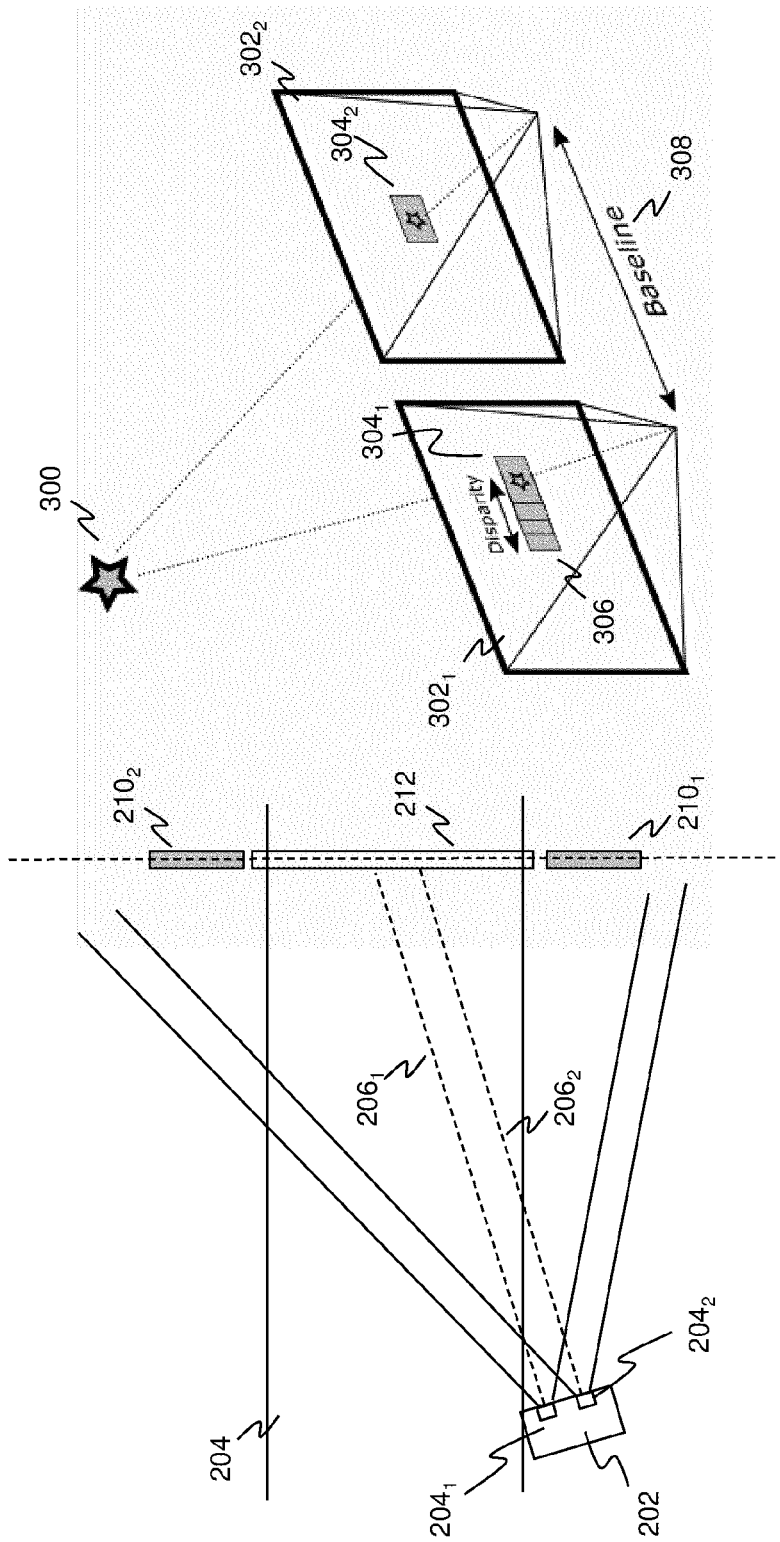
FIG. 2 depicts a camera system for use in a timing system according to an embodiment of the invention.
FIG. 3 depicts disparity mapping of images produced by a camera system.

Camera systems that are capable of generating depths map are known. For example, in an embodiment, a camera may be implemented as a 3D camera system e.g. stereo camera comprising two or more camera modules, wherein each camera module has its own lens system. An example of a top-view of such 3D imaging system is depicted in FIG. 2. As shown in this figure, a stereo camera 202 may be positioned along a side of the track 204. The stereo camera has (at least) two camera modules $204_{1,2}$ with a parallel optical axis $206_{1,2}$ to observe a scene of the race track including objects, e.g. calibration markers $210_{1,2}$ and/or athletes (as depicted in FIG. 1). This way, two images of the same scene from different points of view are acquired. Such stereo camera may be used to determine depth maps and/or 3D pictures. A 3D camera system may have more than two camera modules so that multiple images can be used to compute a depth map. This way the accuracy of the depth maps can be improved.

The 3D camera system (or the computer system controlling the camera system) may include a module for computing a depth map based on video frames captured by the two (or more) camera modules. In an embodiment, the module may use a disparity mapping technique compute a depth map based images generated by the two image sensors. FIG. 3 schematically shows the principle of disparity mapping. The 3D camera system comprises two camera modules separated by a distance which is referred to as the baseline 308. The two camera modules may be synchronized so that each time instance the two video frames $302_{1,2}$ of the same object from a different view point are generate.

To compute a depth map on the basis of these video frames, a matching algorithm may be executed to match corresponding pixels of the left and right video frame. Hence, an object 300 imaged by two synchronized camera modules is positioned in the same position $304_{1,2}$ but separated by a baseline distance 308. In that case, the object will appear on similar positions in both images. The distance between the objects in the left and right image is known as the disparity 306. An algorithm for constructing the disparity map based on the two images is known as a stereo matching algorithm. Various stereo matching algorithm exist, which needs to be both accurate and fast for real-time applications.

It is submitted that the 3D camera system that is used in the embodiments of this application is not limited to stereo based imaging techniques and that other 3D imaging techniques may be used as well. For example, a depth map may be generated based on an RGB/IR technique (as used by the Kinect) or a 3D time-of-flight (TOF) technique or combinations thereof. Further, to increase the angel of view of the camera system, in some embodiments, one or more wide angle camera systems may be used, e.g. a 180-degree camera or a 360-degree camera. Also for such type of video formats, such as 360-video or immersive video, which is generated using special 360 camera systems, wherein the video is projected onto a 2D video frame using e.g. an equirectangular projection, depth maps can be generated.

As shown in FIG. 1, one or more 3D camera systems $102_{1,2}$ may be positioned at the side or above the sports track. Further, the camera systems may be aligned and calibrated such each of the 3D camera systems capture the same scene 114 of the sports track, including objects moving along the track. To that end, one or more calibration markers $110_{1,2}$ may be used. The one or more calibration markers may be positioned at one side of both sides, e.g. at opposite sides, of the track. These calibration markers may be used by the timing system to compute the coordinates of a virtual plane 112 that is positioned across the track between the two calibration markers. After calibration, the relative distance between the 3D camera system and each position on the virtual plane is known. This allows the timing system to determine on the basis of time stamped video frames and associated depth maps at what time instance a moving object has passed the virtual plane.

The calibration process requires a 3D camera system to accurately detect the position and orientation of the calibration markers under all outdoor circumstances. Therefore, the calibration markers are designed to have predetermined distinct shape and/or color combination so that during calibration an object detection program may easily and accurately determine the position of the (edges of) markers in video frames so that the coordinates of the virtual plane can be accurately determined. When the (calibrated) timing system is in operation, the 3D camera system may capture video frames that include athletes passing the through the virtual plane. While the figure illustrates a camera system along the side of the racing track, in other embodiments, one or more of the camera systems may be mounted above the sports track using a suitable mounting structure.

As will be described hereunder in more detail, the timing system depicted in FIG. 1, is configured to determine the passing times of objects passing the virtual plane. Further, the timing system is configured to identify objects for which a passing time is determined. Identification may be based on identification markers associated with the objects. For example, in case of athletes, identification markers may include (but is not limited to) the race BIB, colors, biometric information, etc. In case of a vehicle identification markers may include characteristics of the vehicle, e.g. color, shape, branding marks, etc.

The computer for controlling the one or more 3D camera systems and executing the calibration and timing methods may be implemented as a stand-alone computer or a set of (wirelessly) connected computers. For example, the 3D camera systems that are used for determining the passing time based on virtual plane located across the track may be controlled by a computer that includes a wireless interface for wireless communication with the computers that control the other 3D camera systems.

A plurality of timing systems as depicted in FIG. 1 may be positioned at different locations along the track. This way each timing system may determine passing times based on video frames of objects passing the virtual plane. The timing systems may support a wireless protocol that allows to setup a mesh-network of timing systems along the track. This way, information determined by one timing system may be used by one or more other timing systems that are part of the mesh network.

The data processing methods that are used by the timing system to calculate the depth maps and analyze the video frames may require real-time imaging processing so in some embodiments a special purpose processor, such as a GPU, may be used to execute the computation intensive parts of calibration and timing process. In other embodiments, the one or more 3D camera systems may be connected to cloud resources which may run the computation intensive parts of the processes. A CPU clock or a GPS clock may be used to link the video frames with time information. For example, in an embodiment, each or at least part of the video frames may be linked to a time instance by time stamping the video frames.

The timing system in FIG. 1 may be operated based on a single 3D camera. Alternatively, two or more 3D camera systems at different viewing angles may be used for capturing video frames of the scene. In that case, the 3D camera systems may be time synchronized so that time-stamped video frames of the different 3D camera systems can be easily combined and analyzed. Multiple 3D camera systems may be used to cope with collisions, i.e. events wherein multiple objects pass the virtual plane.

FIGS. 4A and 4B depict an embodiment of a timing system which is calibrated, and a timing system which is in operation respectively. As shown in FIG. 4A, a camera system 402 is positioned along a side of a track 406. At a predetermined distance 460 one or more calibration markers $410_{1,2}$ may be positioned on one or both sides of the track. The field of view of the camera is positioned towards the track so that it captures a scene that includes the one or more calibration markers. Then, a calibration program is executed by the computer 404 of the camera system. During calibration, the camera generates video frames and depth maps of the scene including the one or more calibration markers are determined on the basis of the generated video frames (as e.g. described with reference to FIGS. 2 and 3). An object detection program may be used to detect the calibration markers in the video frames (e.g. the RGB pictures).

The one or more calibration markers may be designed to have features that allow accurate calibration under different outdoor conditions. For example, the shape, edges and/or colors of the marker may be designed to allow accurate detection in the pictures. The depth map associated with the video frames may be used to determine the distance between the camera and the detected calibration markers. Alternatively, if a sufficiently accurate depth map can be constructed, an object detection program may also determine the position the calibration markers directly based on the depth map.

Once the position of the one or more markers has been detected, the computer may determine a virtual plane located between the two calibration markers. The virtual plane may be used as the location at which the timing system determines passing time. This virtual plane may be positioned within a rectangular 3D volume 412 in space, wherein the width of the volume may be determined by the calibration markers and the height and the depth of the volume may be determined by the computer. The 3D volume may define a 3D detection zone in which the timing system will acquire the video data (e.g. video frames) for determining a passing time and for identifying the object associated with the passing time.

The same calibration process may be used to install and calibrate one or more further 3D camera systems along the track so that each of these 3D camera systems may capture video frames of objects passing the same 3D detection zone from a different viewing angle. The camera system may (wirelessly) communicate with each other that the video capturing process can be time-synchronized. This way, at one time instance, each of the camera systems will procedure one or more time-stamped video frames of the sports track that includes the 3D detection zone taken from a particular viewing angle. The time-stamped video frames (and associated depth maps) of the different viewing angles may be used for determining passing times of objects passing the virtual plane and identification of objects for which a passing time has been determined.

Figure 5:
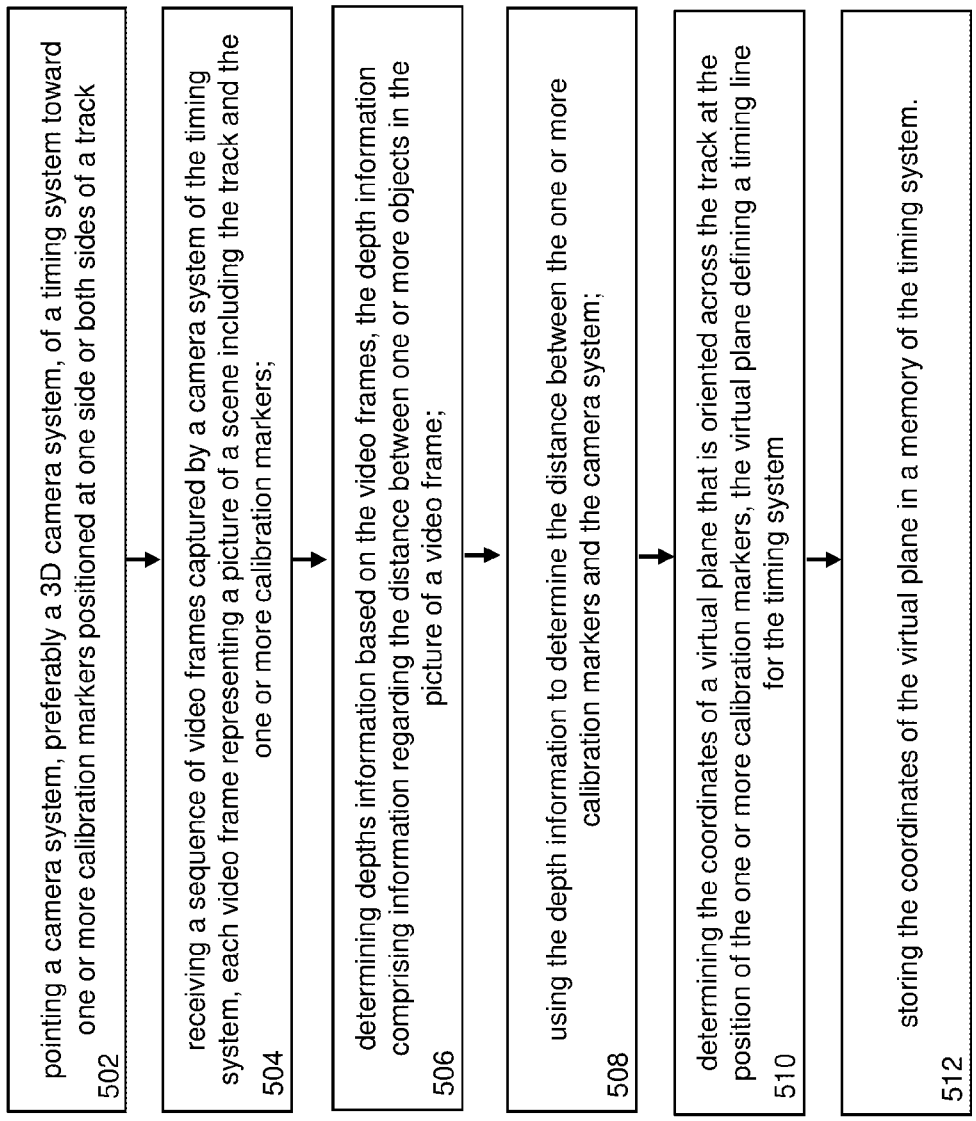
FIG. 5 depicts a flow diagram of a method of calibrating a timing system according to an embodiment of the invention.

FIG. 5 depicts a flow-diagram of a method of calibrating a timing system according to an embodiment of the invention. This method may be used for calibrating a timing system comprising calibration markers as described with reference to FIG. 1 and FIG. 4A. As shown in the flow-diagram, the method may start with pointing a 3D camera system of a timing system toward one or more calibration markers positioned at one side or opposite sides of a track. The one or more calibration markers may indicate the position of a virtual plane that is located across the sports track (step 502). For example, in case of two calibration markers at opposite sides of the track, the virtual plane may be located between the two markers. In the next step 504, a sequence of video frames may be captured by the 3D camera system, wherein each video frame may represent a picture of scene including the track and the calibration markers.

Thereafter, depth information such as one or more depth maps may be determined based on the video frames, the depth map may comprise information regarding the distance between one or more objects in the picture and the 3D camera system (step 506). For example, a depth map may be generated based on two video frames generated by two camera modules in the stereo camera and disparity mapping may be used to generate the depth map in the same way as described with reference to FIGS. 2 and 3 above. The depth information may include a depth map comprising for each video frame (or at least a substantial part thereof) information regarding the distance between objects in the captured video frames and the 3D camera. The depth information may be used to determine the distance between each of the calibration markers and the 3D camera (step 508). Then, coordinates of a virtual plane that is positioned across the track between the calibration markers may be computed. The virtual plane may be used by the timing system to determine a passing time of objects passing the virtual plane. Additionally, coordinates of a 3D volume that is oriented across the sports track between the calibration markers is computed. The 3D volume comprises the virtual plane and defines a detection volume for determining a passing time and identifying the object associated with the passing time (step 510). The coordinates of the virtual plane and the associated 3D volume of the detection zone may be stored in a memory of the timing system (step 512).

Figure 6:
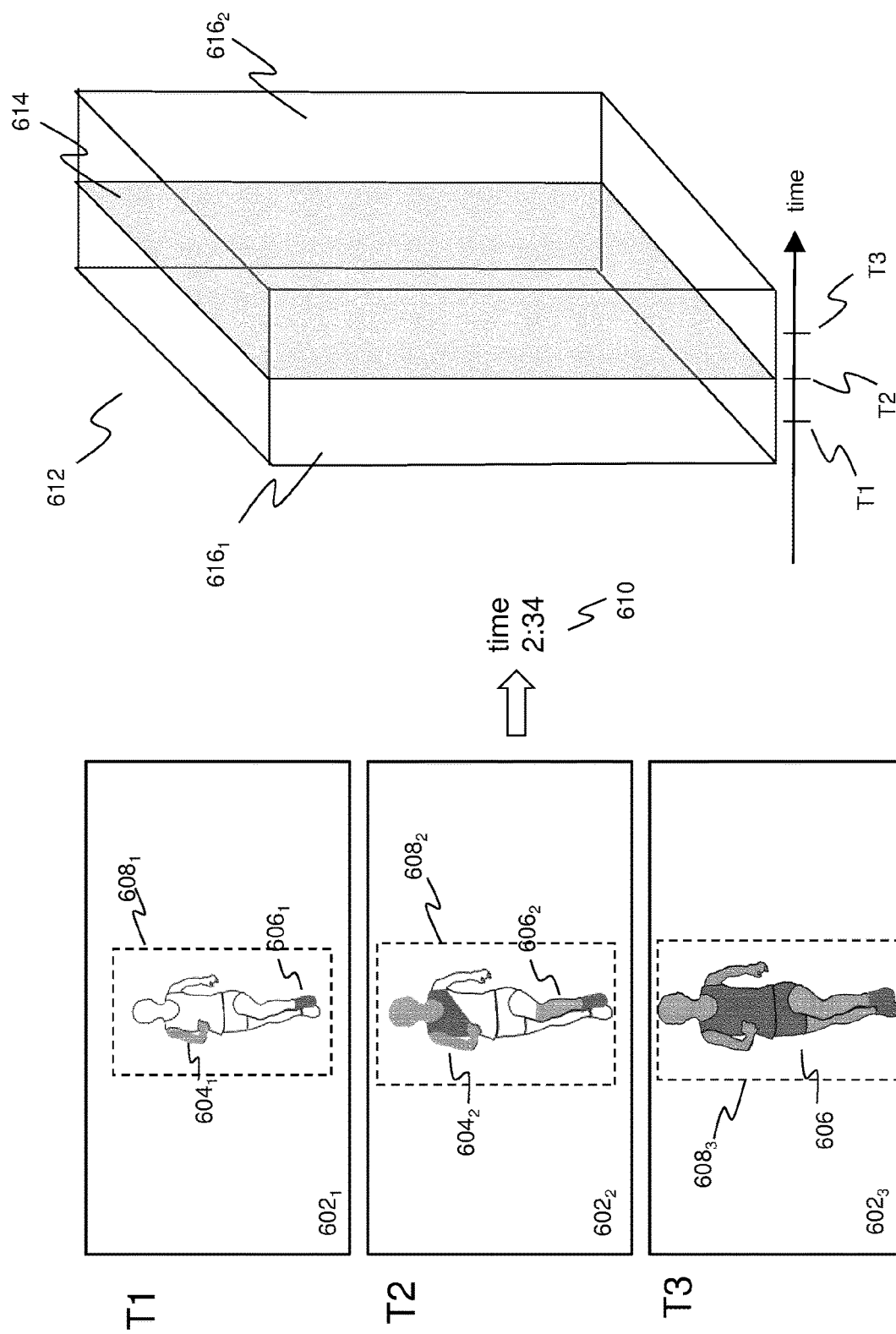
FIGS. 6A and 6B depict a method of determining a passing time according to an embodiment of the invention.

As shown in FIG. 4B, in operation, the timing system no longer needs calibration markers. The calibrated camera system will use the virtual plane in the 3D detection zone to determine a passing time and one or more identification features of the object that is passing the virtual plane. This process will be referred to as a passing event, which will be described in more detail with reference to FIGS. 6 and 7.

FIGS. 6A and 6B depict a method of determining a passing time according to an embodiment of the invention. FIG. 6A shows three snapshots of a moving object (in this case an athlete) passing a 3D detection zone of a timing a system as described within reference to the embodiments of this application. The 3D detection zone may be set up using a calibration method as described above with reference to FIG. 5. As shown in FIG. 6B, the 3D detection zone 612 includes a virtual plane 614 located across the track wherein the normal of the virtual plane is substantially parallel to the direction of the sports track. The virtual plane divides the 3D detection zone in a first part $616_1$ in which the object moves towards the virtual plane and crosses it and a second part $616_2$ in which the moving object crosses the virtual plane and moves away from it.

Thus, when an object moves along the track, the 3D camera system will capture images (pairs of images in case of a stereo camera) of a scene that includes the 3D detection zone. For each image (video frame) the 3D image system may compute a depth map. An object detection and tracking algorithm may be used to detect and track a predetermined object, e.g. a human object or an object representing an object, in subsequent video frames. Known object detection algorithms. Based on the depth maps, the computer may determine that a detected object enters the first part of the 3D detection zone. In that case, the computer may start storing video frames and associated depth maps in a buffer until the object leaves the 3D detection zone via the second part. In another, embodiment only the pairs of video frames are stored and the depth maps are determined layer. These video frames and depth maps are used by the computer to determine a passing time and to identify the object associated with the passing time.

FIGS. 6A and 6B illustrate a method of determining a passing time according to an embodiment of the invention. In particular, FIG. 6A depicts an object (in this example an athlete) moving through the 3D detection zone of the 3D camera system. FIG. 6A depicts three samples $602_{1-3}$ of a sequence of time-stamped video frames when the athlete moves through the 3D detection zone. These video frames that are captured by the 3D camera system and stored in the computer. As shown in FIG. 6B, the first video frame $602_1$ is captured at time instance T1, i.e. the time that most part of the body of the athlete was still in the first part $616_1$ of the 3D detection zone. At time instance T2, a second video frame $602_2$ is captured wherein the athlete moves further and passes the virtual plane 614 of the 3D detection zone. Finally, at time instance T3, a third video frame $602_3$ is captured wherein the athlete has moved into the second part $616_2$ of the 3D detection zone.

A passing time module in the computer of the timing system may analyse the sequence of time-stamped video frames to determine at what time instance the athlete has passed the virtual plane. To that end, an object detection and classification algorithm may be applied to each video frame. To that end the algorithm may determine in the video frame region of interests $608_{1-3}$ (ROIs) that belong to an object. Further, for each of these ROIs, the algorithm may classify pixels as belonging to the athlete or not (the background). Further, a depth map associated with each of the video frames may be used to determine distance values belonging to pixels that are classified as belonging to the object. These distance values may be compared with the distance between the camera and the virtual plane. This way, when the 3D camera system captures an object crossing the virtual plane, for each video frame the part of the pixels of the object that have crossed the virtual plane can be determined. This is visible in the video frames of FIG. 6A wherein the grey areas define pixels of (parts of) the object that have crossed the virtual plane.

For the video frame at time instance T1 only pixels $604_1$ representing part of a hand and pixels $606_1$ representing a shoe of the athlete are associated with distance values smaller than the distance between the virtual plane and the 3D camera system. Similarly, for the video frame at time instance T2, pixels $604_1$ representing part of the upper body and pixels $606_2$ representing part of a leg are associated with distance values smaller than the distance between the virtual plane and the 3D camera system. Finally, for the video frame at T3 all pixels 608 representing the athlete are associated with distance values smaller than the distance between the virtual plane and the 3D camera system. Based on this analysis, the computer may determine that at T2, a substantial part of the body of the athlete has crossed the virtual plane. For example, the computer may determine that if a part of object that has crossed the virtual plane is larger than a certain threshold value that in that case, it is determined that the athlete has crossed the plane. Hence, the time-stamp T2 may in that case define the passing time 610, in this example 2:34. Different rules may be defined in order to determine if an object has crossed the virtual plane.

Figure 7:
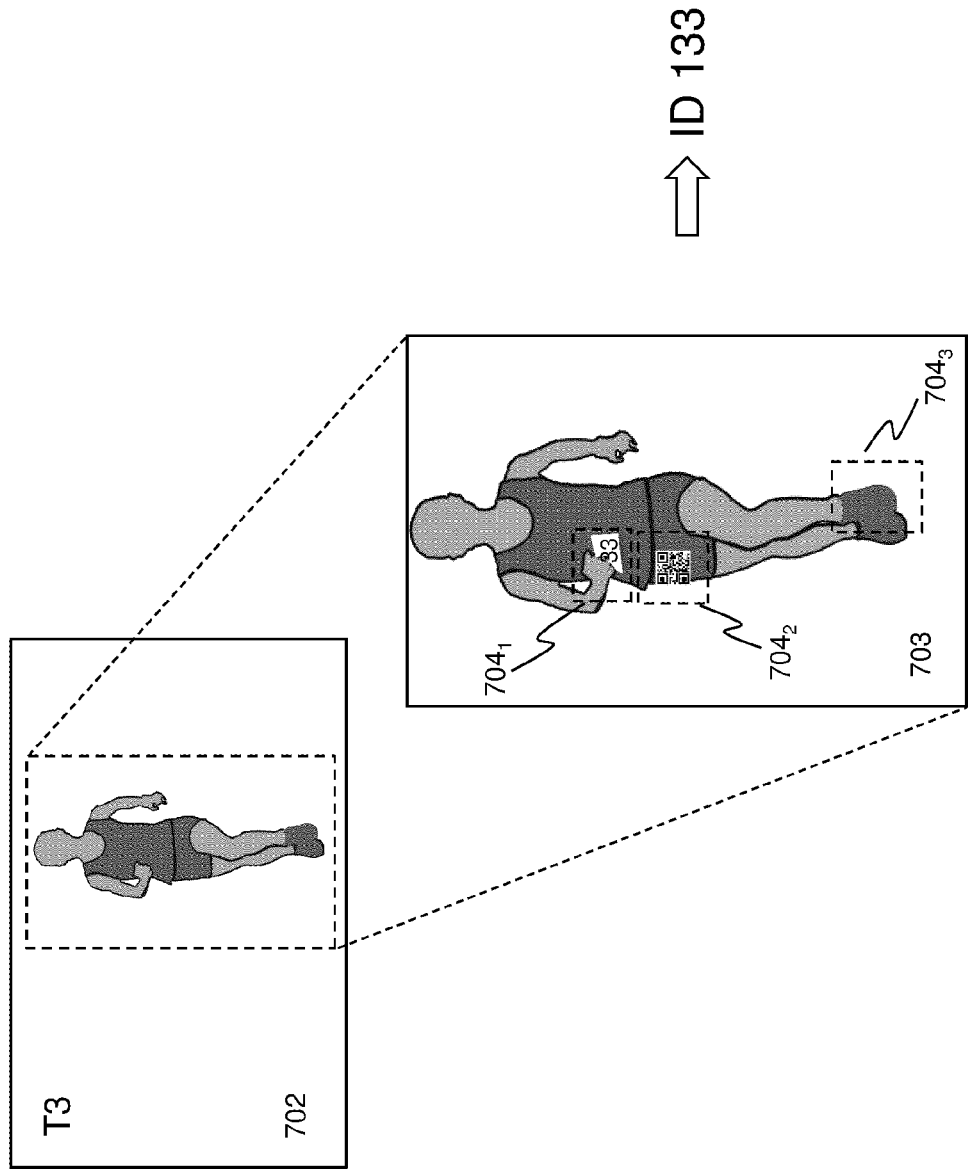
FIG. 7 depicts a method of identification of a timed object according to an embodiment of the invention.

FIG. 7 depicts a method of identification of a timed object according to an embodiment of the invention. Once a passing time for an object has been established, the identity of the object may be established. To that end, the stored video frames video frames may be analysed by an object identification module. The regions of interest (ROIs) in the video frames may be subjected to a feature analysis process which searches for predetermined features in a ROI. For example, as shown in FIG. 7, the ROI 703 of video frame T3 702 from FIG. 6 may be subjected to a feature analysis algorithm which may be configured to identify predetermined features such as predetermined markers, e.g. a bib $704_1$ or a code such as a OR code $704_2$. Any uniquely identification feature may be used include shoe type $704_3$, biometric markers, a colored or specially shaped markers or a combination thereof. The analysis may be performed based on a set of ROIs from different video frames during the passing of the 3D detection zone. It may be frequently the case, that the video frame that is used for determining the passing time, is not suitable for identification purposes. Hence, object identification module may determine that the time-stamped video frame (e.g. video frame at T2 in the example of FIG. 6) represents a picture of the object crossing the virtual plane is not suitable for reliable identification of the object. In that case, it may determine one or more other video frames (e.g. video frame at T3 in the example of FIG. 6) are suitable for reliable identification of the timed object. Any known object detection algorithm may be used for identifying features in the ROI, including conventional computer vision algorithms, machine learning and deep learning techniques. For example, in an embodiment, one or more deep neural network may be used for determining a ROI in a video frame, that comprises the object, and for determining certain features associated with an object.

Figure 8:
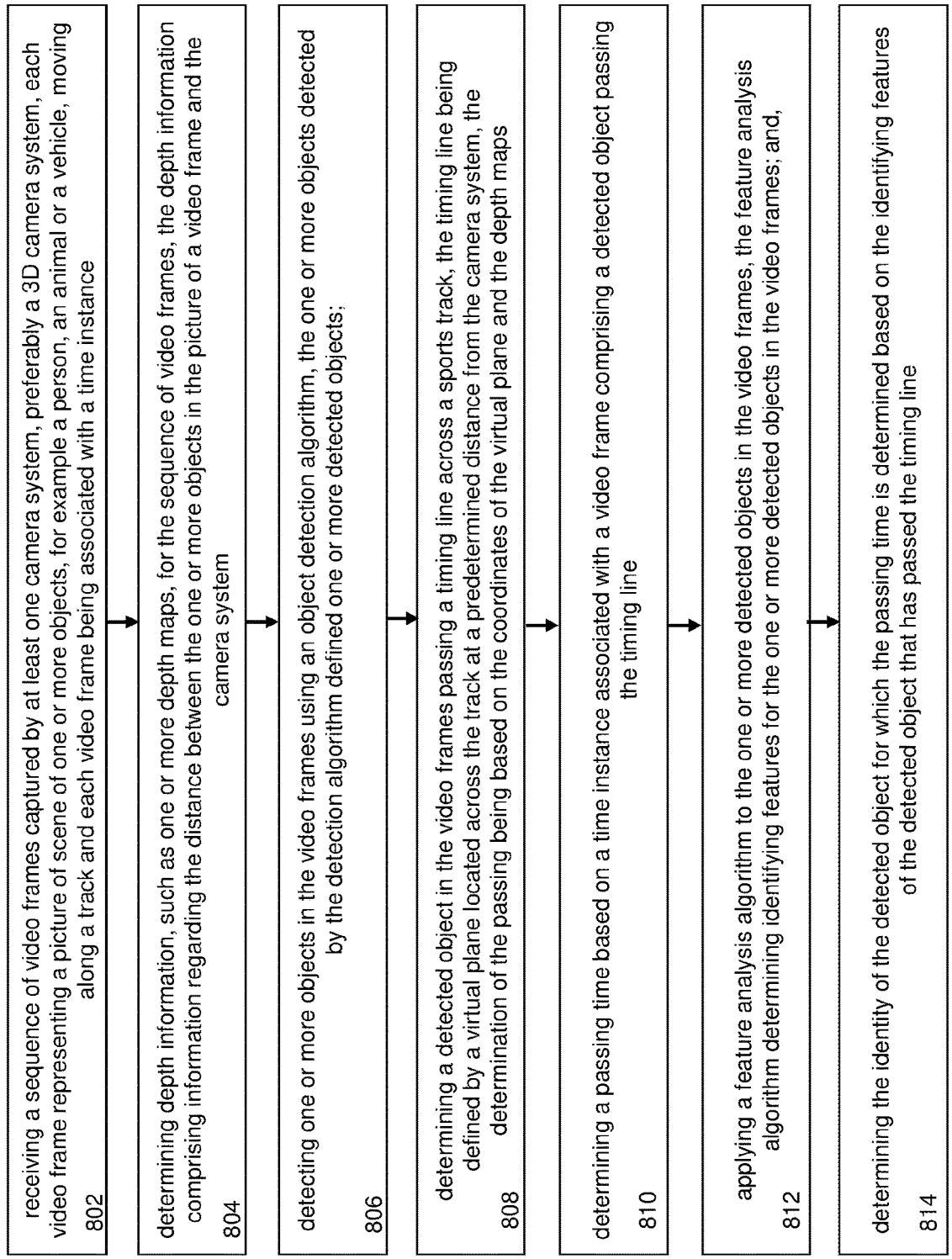
FIG. 8 depicts a flow diagram of a method of determining a passing time according to an embodiment of the invention.

FIG. 8 depicts a flow diagram of a method of determining a passing time according to an embodiment of the invention. As shown in this figure, the method may start with receiving a sequence of video frames captured by at least one camera system, preferably a 3D camera system, each video frame representing a picture of scene of one or more objects, for example a person, an animal or a vehicle, moving along a track and each video frame being time-stamped (step 802). Thereafter, depth information, such as one or more depth maps, may be determined for the sequence of video frames, wherein the depth information may comprise information regarding the distance between the one or more objects in the picture of a video frame and the camera system (step 804). Typically, the 3D camera system may be a stereo camera so that it produces pairs of video frames which can be used to determine a depth map. Thereafter, one or more objects in the video frames may be detected using an object detection algorithm, the one or more objects detected by the detection algorithm defined one or more detected objects (step 806). Thus, within each video frame an object may be identified and a distance between the identified object and the 3D camera system is determined.

In an embodiment, the object detection step may include determining regions of interest ROIs comprising the object and for each ROI subjecting the pixels in the ROI to a classification algorithm for classifying whether a pixel represents part of the object or part of the background.

Further, a detected object in the video frames passing a timing line across a sports track may be determined wherein the timing line is defined by a virtual plane located across the track at a predetermined distance from the camera system, the determination of the passing being based on the coordinates of the virtual plane and the depth maps (step 808). Hence, the distance between the 3D camera system and the virtual plane may be compared with the distance between the 3D camera system and the detected object. Then, determining a passing time based on a time instance, e.g. a time stamp, associated with one or more video frames comprising a detected object passing the timing line (step 810). For example, to that end, one or more video frames may be determined wherein a part of the object that has passed the virtual plane has certain dimensions.

Hence, certain rules may be used to determine if the object has passed the virtual plane. The time instance, e.g. time stamp, associated with the video frame that depicts that situation defines the passing time. Thereafter, a feature analysis algorithm may be applied to the one or more detected objects in the video frames, the feature analysis algorithm determining identifying features for the one or more detected objects in the video frames (step 812) and the identity of the detected object for which the passing time is may be determined based on the identifying features of the detected object that has passed the timing line.

In an embodiment, the object detection algorithm and the feature analysis algorithm are part of a machine learning algorithm, preferably a deep learning algorithm such as a convolutional deep neural network system, that is trained to detected one or more objects in a video frame and to determine identifying features associated with detected objects.

Thus, different pictures from the sequence of video frames may be used by the identification of the object that has crossed the virtual plane at the passing time. Hence, the video frame that is used for determining the passing time of an object may be different from the one or more video frames that are used for determining the identity of the object.

Figure 9:
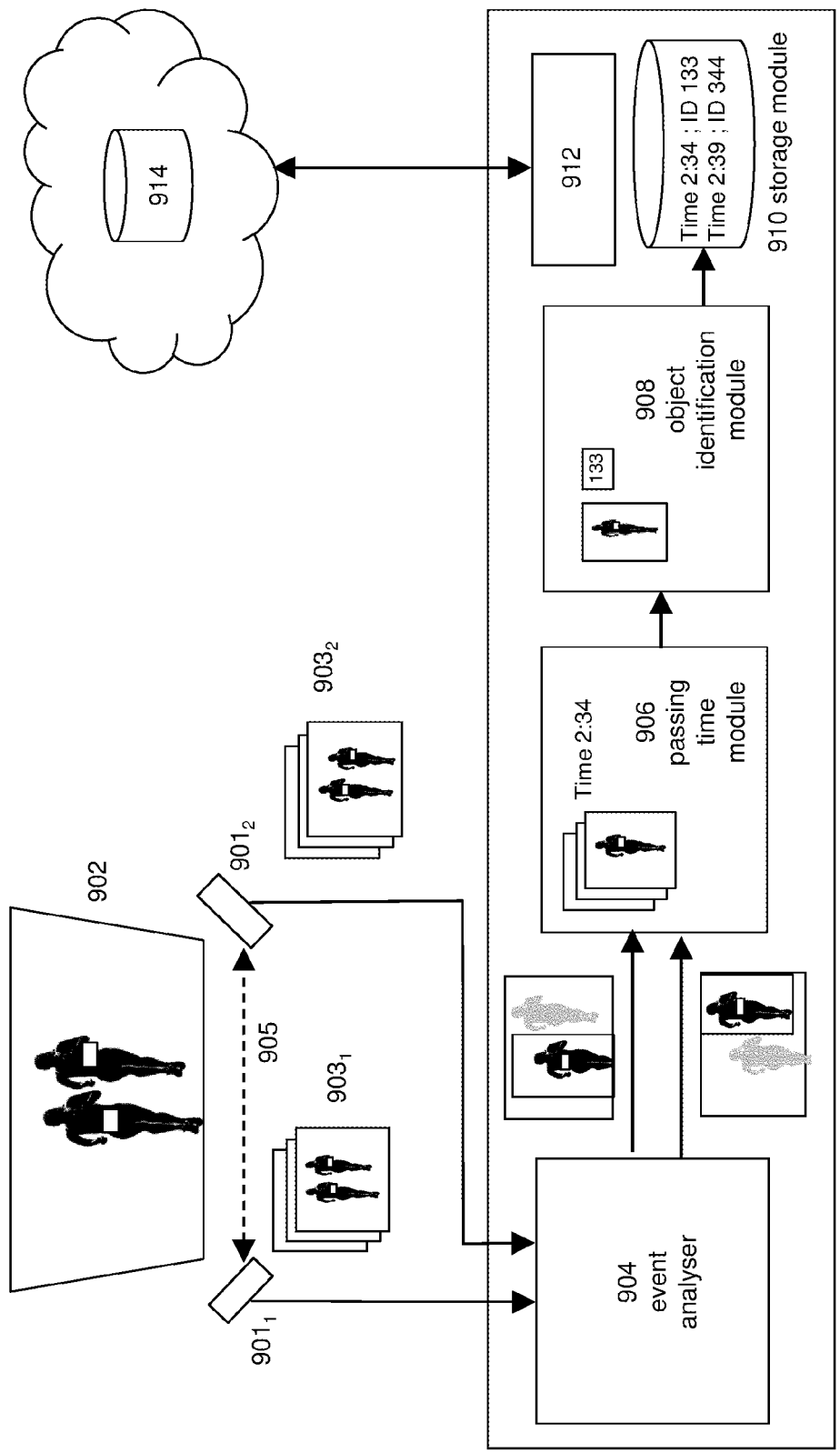
FIG. 9 depicts a system for determining a passing time according to an embodiment of the invention.

FIG. 9 depicts a system for determining a passing time according to an embodiment of the invention. As shown in the figure, the system includes one or more camera systems $901_{1,2}$ connected to a computer system that is configured to control the camera systems and to process the video frames $903_{1,2}$ generated by the camera systems. Each of the camera systems is calibrated according to the calibration method as described in this application so that it captures a scene of a track comprising moving objects that pass a time line represented by a virtual plane 902. The computer system may comprise an event analyser 904 for performing object detection and feature analysis of the objects in the video frames using a suitable algorithm. Further, the event analyser may generate depth information, e.g. depth maps, associated with the video frames. A passing module 906 may determine a passing time based on the depth information and the coordinates of the virtual plane. Further, an object identification module 908 may identify objects that are detected and associated with a passing time by the passing time module. The passage times and the ID's of the object that have passed may be stored in a memory of the computer. Additionally, a picture of the passing of the timed object may be stored. This information may be communicated via a (wireless) interface 912 a network server 914.

FIG. 10 depicts some exemplary pictures of objects passing a timing line of a timing system according to an embodiment of the invention. As shown in the pictures, calibration makers are used to set up a virtual plane between the markers. The plane is positioned perpendicular to the track so that objects such as athletes can cross the plane. The pictures further show that the timing system is able to detect—during the passing of the object—a part of an object that has passed the virtual plane (denoted by the white parts) and a part of an object that has not passed the finish line.

Figure 11:
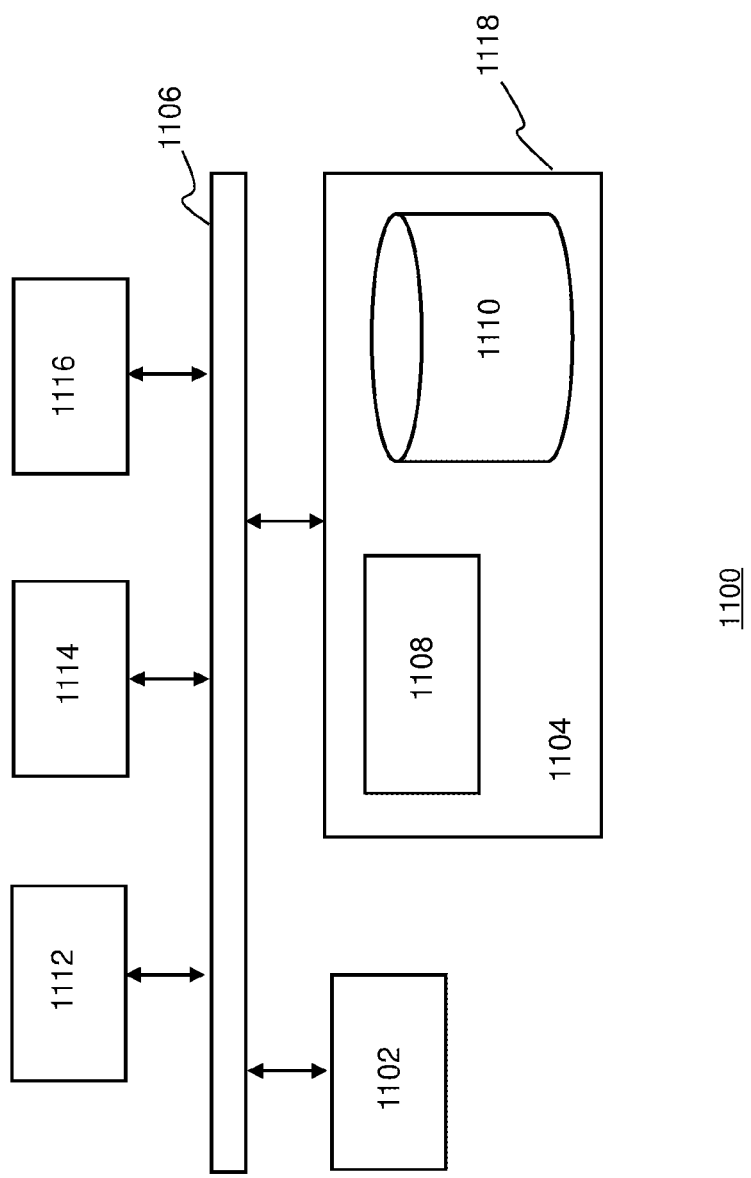
FIG. 11 is a block diagram illustrating an exemplary data processing system that may be used for executing methods and software products described in this application.

FIG. 11 is a block diagram illustrating exemplary data processing systems described in this disclosure. Data processing system 1100 may include at least one processor 1102 coupled to memory elements 1104 through a system bus 1106. As such, the data processing system may store program code within memory elements 1104. Further, processor 1102 may execute the program code accessed from memory elements 1104 via system bus 1106. In one aspect, data processing system may be implemented as a computer that is suitable for storing and/or executing program code. It should be appreciated, however, that data processing system 2100 may be implemented in the form of any system including a processor and memory that is capable of performing the functions described within this specification.

Memory elements 1104 may include one or more physical memory devices such as, for example, local memory 1108 and one or more bulk storage devices 1110. Local memory may refer to random access memory or other non-persistent memory device(s) generally used during actual execution of the program code. A bulk storage device may be implemented as a hard drive or other persistent data storage device. The processing system 1100 may also include one or more cache memories (not shown) that provide temporary storage of at least some program code in order to reduce the number of times program code must be retrieved from bulk storage device 1110 during execution.

Input/output (I/O) devices depicted as input device 1112 and output device 1114 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1116 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1100.

As pictured in FIG. 11, memory elements 1104 may store an application 1118. It should be appreciated that data processing system 1100 may further execute an operating system (not shown) that can facilitate execution of the application. Application, being implemented in the form of executable program code, can be executed by data processing system 1100, e.g., by processor 1102. Responsive to executing application, data processing system may be configured to perform one or more operations to be described herein in further detail.

In one aspect, for example, data processing system 1100 may represent a client data processing system. In that case, application 1118 may represent a client application that, when executed, configures data processing system 2100 to perform the various functions described herein with reference to a "client". Examples of a client can include, but are not limited to, a personal computer, a portable computer, a mobile phone, or the like.

In another aspect, data processing system may represent a server. For example, data processing system may represent an (HTTP) server in which case application 1118, when executed, may configure data processing system to perform (HTTP) server operations. In another aspect, data processing system may represent a module, unit or function as referred to in this specification.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for determining a passing time of an object passing a timing line across a sports track, the method comprising:
receiving video frames captured by at least one camera system, each video frame representing a picture of a scene of one or more objects moving along a sports track and each video frame being associated with a time instance, the one or more objects representing one or more persons, one or more animals or one or more vehicles respectively;
determining depth information for each of the video frames, the depth information comprising information regarding a distance between the one or more objects in the picture of a video frame and the camera system;
detecting the one or more objects in the video frames using an object detection algorithm, the one or more objects detected by the object detection algorithm defining one or more detected objects and using the depth information to determine for each of the video frames a distance between the camera system and a detected object of the one or more detected objects;
determining a video frame comprising the detected object passing the timing line across the sports track, the timing line being defined by a virtual plane located across the sports track at a predetermined distance from the camera system, the determining of the video frame being based on coordinates of the virtual plane and comprising comparing the distance between the camera system and the detected object and the predetermined distance between the camera system and the virtual plane; and
determining a passing time based on the time instances of the video frame comprising the detected object passing the timing line.

2. The method according to claim 1, further comprising:
applying a feature analysis algorithm to the one or more detected objects in the video frames, the feature analysis algorithm determining identifying features for the one or more detected objects in the video frames; and,
determining an identity of a detected object for which the passing time is determined based on identifying features of the detected object that has passed the timing line.

3. The method according to claim 2, wherein the identifying features of the detected object include one or more an optically readable identification markers; and/or, one or more characteristics about a shape and/or color of the detected object; and/or, when the detected object is an animal or a human, one or more biometric identifiers of the detected object.

4. The method according to claim 2 wherein the object detection algorithm and the feature analysis algorithm are part of a machine learning algorithm that is trained to detected one or more objects in a video frame and to determine identifying features associated with detected objects.

5. The method according to claim 1, wherein detecting the one or more objects in the video frames includes:

determining one or more regions of interest (ROIs) in a video frame, each ROI comprising pixels representing an object;
determine identifying features in one of the one or more ROIs; and,
determine an object in the ROI based on the determined identifying features.

6. The method according to claim 1, wherein the camera system comprises a plurality of camera modules the plurality of cameras being configured to generate at each time instance at least a first video frame and a second video frame of the scene and wherein a depth map is determined based on a disparity mapping algorithm configured to determine a disparity between pixels of the first and second video frame.

7. The method according to claim 1 wherein the passing time is determined based on a video frame of the scene wherein a predetermined part of the detected object that has passed the virtual plane.

8. A method for determining a passing time of objects passing a timing line across a sports track, the method comprising:
receiving video frames from a plurality of camera systems, the plurality of camera systems capturing a scene of the sports track from different angles of view, the video frames representing pictures of the scene comprising one or more objects moving along the sports track, each of the video frames being associated with a time instance, the one or more objects representing one or more persons, one or more animals or one or more vehicles respectively;
determining depth information for each of the video frames, the depth information comprising information regarding a distance between the one or more objects in the picture of a video frame and at least one of the plurality of camera systems;
detecting the one or more objects in the video frames using an object detection algorithm, the one or more objects detected by the object detection algorithm defining one or more detected objects and using the depth information to determine for each of the video frames a distance between the camera system and a detected object of the one or more detected objects;
determining a video frame comprising the detected object passing the timing line across the sports track, the timing line being defined by a virtual plane located across the sports track at predetermined distances from the plurality of camera systems, the determining of the video frame being based on coordinates of the virtual plane and comprising comparing the distance between the camera system and the detected object and the predetermined distance between the camera system and the virtual plane; and,
determining a passing time based on one or more time instances of the video frames comprising the detected object passing the timing line.

9. The method according to claim 8, further comprising:
applying a feature analysis algorithm to the one or more detected objects in the video frames, the feature analysis algorithm determining identifying features for the one or more detected objects in the video frames; and,
determining an identity of a detected object for which the passing time is determined based on the identifying features of the detected object that has passed the timing line.

10. A method for calibrating a sports timing system configured to determine a passing time of an object passing a timing line across a sports track, the method comprising:

receiving video frames captured by a camera system of the sports timing system, each video frame representing a picture of a scene including the sports track and one or more calibration markers;

determining depth information for each of the video frames, the depth information comprising information regarding a distance between one or more objects in the picture of a video frame and the camera system, the one or more objects representing one or more persons, one or more animals or one or more vehicles respectively, and the depth information additionally comprising information regarding the distance between the one or more calibration markers in the picture of a video frame and the camera system;

using the depth information to determine a distance between the one or more calibration markers and the camera system;

determining coordinates of a virtual plane that is positioned across the sports track at a location of the one or more calibration markers, the virtual plane defining a timing line for the timing system; and, storing the coordinates of the virtual plane in a memory of the sports timing system.

11. A sports timing system for determining a passing time of an object passing a timing line across a sports track, the system comprising:

at least one camera system connected to a computer;

the computer comprising a computer readable storage medium having computer readable program code embodied therewith, and a processor coupled to the computer readable storage medium, wherein responsive to executing the computer readable program code, the processor is configured to perform executable operations comprising:

receiving video frames captured by at least one camera system, each video frame representing a picture of a scene of one or more objects moving along a sports track and each video frame being associated with a time instance, the one or more objects representing one or more persons, one or more animals or one or more vehicles respectively;

determining depth information for each of the video frames, the depth information comprising information regarding a distance between the one or more objects in the picture of a video frame and the camera system;

detecting the one or more objects in the video frames using an object detection algorithm, the one or more objects detected by the object detection algorithm defining one or more detected objects and using the depth information to determine for each of the video frames a distance between the camera system and a detected object of the one or more detected objects;

determining a video frame comprising the detected object passing the timing line across the sports track, the timing line being defined by a virtual plane located across the sports track at a predetermined distance from the camera system, the determining of the video frame being based on coordinates of the virtual plane and comprising comparing the distance between the camera system and the detected object and the predetermined distance between the camera system and the virtual plane; and determining a passing time based the time instances of the video frames comprising the detected object passing the timing line.

12. The system according to claim 11 wherein the executable operations further comprise:

applying a feature analysis algorithm to the one or more detected objects in the video frames, the feature analysis algorithm determining identifying features for the one or more detected objects in the video frames; and, determining an identity of a detected object for which the passing time is determined based on the identifying features of the detected object that has passed the timing line.

13. A calibration module for a sports timing system configured to determine a passing time of an object passing a timing line across a sports track, the module comprising:

receiving video frames captured by a camera system of a sports timing system, each video frame representing a picture of scene including the sports track and one or more calibration markers;

determining depth information for each of the video frames, the depth information comprising information regarding a distance between one or more objects in the picture of a video frame and the camera system, the one or more objects representing one or more persons, one or more animals or one or more vehicles respectively, and the depth information additionally comprising information regarding a distance between the one or more calibration markers in the picture of a video frame and the camera system;

using the depth information to determine a distance between the one or more calibration markers and the camera system;

determining coordinates of a virtual plane that is positioned across the sports track at a location of the one or more calibration markers, the virtual plane defining a timing line for the timing system; and, storing the coordinates of the virtual plane in a memory of the sports timing system.

14. A non-transitory computer program or suite of non-transitory computer programs comprising at least one software code portion or a non-transitory computer program product storing at the at least one software code portion, the at least one software code portion, when run on a computer system, being configured for executing the method steps according to claim 1.

15. A non-transitory computer-readable storage medium storing at least one software code portion, the software code portion, when executed or processed by a computer, is configured to perform the method steps according to claim 8.

* * * * *